United States Patent
Mizoguchi

(10) Patent No.: US 11,407,417 B2
(45) Date of Patent: Aug. 9, 2022

(54) VEHICLE DRIVING ASSIST APPARATUS

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 196 days.

(21) Appl. No.: 16/898,857

(22) Filed: Jun. 11, 2020

(65) Prior Publication Data

US 2021/0046935 A1 Feb. 18, 2021

(30) Foreign Application Priority Data

Aug. 13, 2019 (JP) .............................. JP2019-148502

(51) Int. Cl.
*B60W 30/18* (2012.01)
*B60W 30/045* (2012.01)
*B60W 30/14* (2006.01)
*B60W 50/08* (2020.01)
*B60W 60/00* (2020.01)

(52) U.S. Cl.
CPC .... *B60W 30/18154* (2013.01); *B60W 30/045* (2013.01); *B60W 30/146* (2013.01); *B60W 50/085* (2013.01); *B60W 50/087* (2013.01); *B60W 60/0053* (2020.02); *B60W 2520/105* (2013.01); *B60W 2552/30* (2020.02)

(58) Field of Classification Search
CPC ....... B60W 30/18154; B60W 60/0053; B60W 30/045; B60W 30/146; B60W 50/085; B60W 50/087; B60W 2552/30; B60W 2520/105

See application file for complete search history.

(56) References Cited

U.S. PATENT DOCUMENTS

| 8,670,915 | B2* | 3/2014 | Kuge | B60W 10/06 |
| | | | | 701/96 |
| 9,098,080 | B2* | 8/2015 | Norris | G05D 1/0061 |
| 2012/0221209 | A1* | 8/2012 | Tatsukawa | B60W 10/184 |
| | | | | 701/42 |
| 2019/0225219 | A1* | 7/2019 | Ueda | B60W 30/18159 |

FOREIGN PATENT DOCUMENTS

| EP | 2927078 A1 * 10/2015 | ............ B60W 50/12 |
| JP | 2014-227877 A 12/2014 | |

* cited by examiner

*Primary Examiner* — Nicholas Kiswanto
*Assistant Examiner* — Mohamad O El Sayah
(74) *Attorney, Agent, or Firm* — McDermott Will & Emery LLP

(57) ABSTRACT

A vehicle driving assist apparatus includes an first calculator to calculate a degree of acceleration suppression, a controller to suppress target acceleration based on the degree of acceleration suppression, a map information storage to store road map information, an estimator to estimate a vehicle position and identify a traveling lane on the road map information, a detector to detect whether there is a crossing road ahead of the identified traveling lane, and a second calculator to calculate an azimuth angle difference between an azimuth of the crossing road where the own vehicle is about to turn and an azimuth in the traveling direction of the own vehicle. The acceleration suppression degree calculator makes a degree of acceleration suppression for suppressing the acceleration of the own vehicle higher then an azimuth angle difference becomes narrower based on the azimuth angle difference.

12 Claims, 10 Drawing Sheets

VEHICLE DRIVING ASSIST APPARATUS

CROSS-REFERENCE TO RELATED APPLICATIONS

The present application claims priority from Japanese Patent Application No. 2019-148502 filed on Aug. 13, 2019, the entire contents of which are hereby incorporated by reference.

BACKGROUND

The technology relates to a vehicle driving assist apparatus that makes variable a degree of acceleration suppression for suppressing acceleration of an own vehicle in accordance with an azimuth angle difference between an azimuth in a traveling direction of the own vehicle and an azimuth of a crossing road where the own vehicle is about to turn.

When driving an own vehicle, a driver cannot watch the accelerator pedal and the brake pedal when trying to slow down and stop the vehicle from a traveling state or keep the vehicle stopped, and the driver may step on the accelerator pedal mistaking it for the brake pedal and continue stepping on the accelerator pedal without noticing the misstep.

As countermeasures for such a misstep, a misstep preventing apparatus that can be added separately to the accelerator pedal, a one-pedal misstep preventing apparatus that can be attached in place of the existing accelerator pedal and brake pedal in which the accelerator pedal and the brake pedal are integrated as one body are already commercially available. However, retrofitting of such a misstep preventing apparatus will impose an economic burden on a user. On the other hand, the one-pedal system requires a certain period of time for the user to get used to operation.

Thus, for example, Japanese Unexamined Patent Application Publication (JP-A) No. 2014-227877 discloses a technique for detecting a misstep using a vehicle speed sensor, an obstacle detection sensor for detecting an obstacle ahead and existing sensors for detecting a driving state and traveling environment of the own vehicle such as an accelerator position sensor (accelerator opening sensor).

That is, the technique disclosed in the aforementioned publication examines the presence of an obstacle hindering traveling of the own vehicle using an obstacle detection sensor, examines, when an obstacle is detected, whether a depression amount and a depression speed of the accelerator pedal detected using an accelerator position sensor exceed predetermined thresholds and restricts, when the depression amount and the depression speed exceed the thresholds, the throttle opening to prevent abrupt acceleration.

SUMMARY

An aspect of the technology provides a vehicle driving assist apparatus. The apparatus includes an acceleration suppression degree calculator, a traveling state controller, a map information storage, an own vehicle position estimator, a crossing road detector, and an azimuth angle difference calculator. The acceleration suppression degree calculator is configured to calculate a degree of acceleration suppression for suppressing acceleration of an own vehicle. The traveling state controller is configured to suppress target acceleration of the own vehicle based on the degree of acceleration suppression calculated by the acceleration suppression degree calculator. The map information storage is configured to store road map information. The own vehicle position estimator is configured to estimate a position of the own vehicle that is a current position of the own vehicle, and identify a traveling lane on the road map information stored in the map information storage based on the position of the own vehicle. The crossing road detector configured to detect whether there is a crossing road ahead of the traveling lane identified by the own vehicle position estimator, based on the road map information stored in the map information storage. The azimuth angle difference calculator is configured to calculate, when the crossing road is detected by the crossing road detector, an azimuth angle difference between an azimuth of the crossing road where the own vehicle is about to turn and an azimuth in the traveling direction of the own vehicle. The acceleration suppression degree calculator sets the degree of acceleration suppression to a higher value as the azimuth angle difference becomes narrower, based on the azimuth angle difference calculated by the azimuth angle difference calculator.

An aspect of the technology provides a vehicle driving assist apparatus. The apparatus includes a map information storage and circuitry. The map information storage is configured to store road map information. The circuitry is configured to calculate a degree of acceleration suppression for suppressing acceleration of an own vehicle. The circuitry is configured to suppress target acceleration of the own vehicle based on the calculated degree of acceleration suppression. The circuitry is configured to estimate a position of the own vehicle that is a current position of the own vehicle and identify a traveling lane on road map information stored in a map information storage based on the position of the own vehicle. The circuitry is configured to detect whether there is a crossing road ahead of the identified traveling lane on a basis of the road map information stored in the map information storage. The circuitry is configured to calculate, when the crossing road is detected, an azimuth angle difference between an azimuth of the crossing road where the own vehicle is about to turn and an azimuth in the traveling direction of the own vehicle. The circuitry is configured to set the degree of acceleration suppression to a higher value as the azimuth angle difference becomes narrower, based on the calculated azimuth angle difference.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

However, in the technique disclosed in JP-A No. 2014-227877, when the obstacle detection sensor has not detected any obstacle hindering traveling, it is determined that it is not necessary to prevent abrupt acceleration and no further processing is performed.

However, there is inconvenience that the function of preventing abrupt acceleration cannot be fully demonstrated due to a misstep in a place where obstacle detection is originally required such as a place in an environment where the obstacle detection sensor cannot sufficiently detect an obstacle due to, for example, a dense fog, rainfall, snowfall or the like or a place where there is a T-junction ahead and there is no obstacle to be detected ahead.

Note that this also applies when a driving mode in automatic driving control is shifted from an automatic driving mode to a driving assist mode such as well-known adaptive cruise control (ACC) and active lane keep (ALK) control.

Considering the above situations, it is desirable to provide a vehicle driving assist apparatus capable of recognizing in advance, a place where abrupt acceleration needs to be suppressed without using any obstacle recognition sensor and appropriately suppressing occurrence of abrupt acceleration caused by a misstep in the place.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 9:
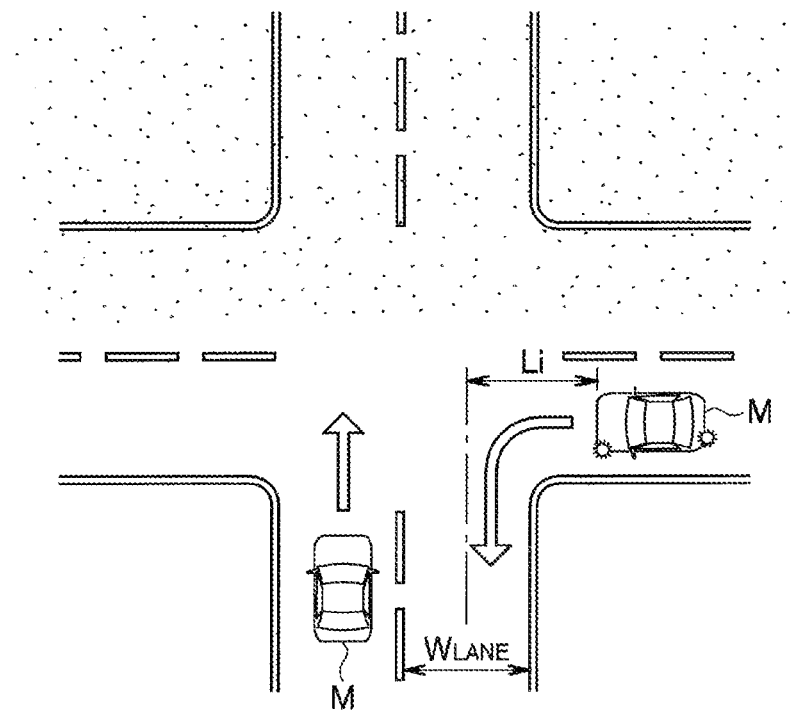
FIG. 9 is an explanatory diagram illustrating acceleration suppression control when an own vehicle travels straight ahead or turns left.

Note that for the sake of convenience, FIG. 9, FIG. 11, FIG. 13 and FIG. 14 illustrate situations in which own vehicles M are individually traveling on a road having one lane on one side. For example, FIG. 9 illustrates an own vehicle M traveling straight ahead and another own vehicle M turning left on the same drawing.

Figure 1:
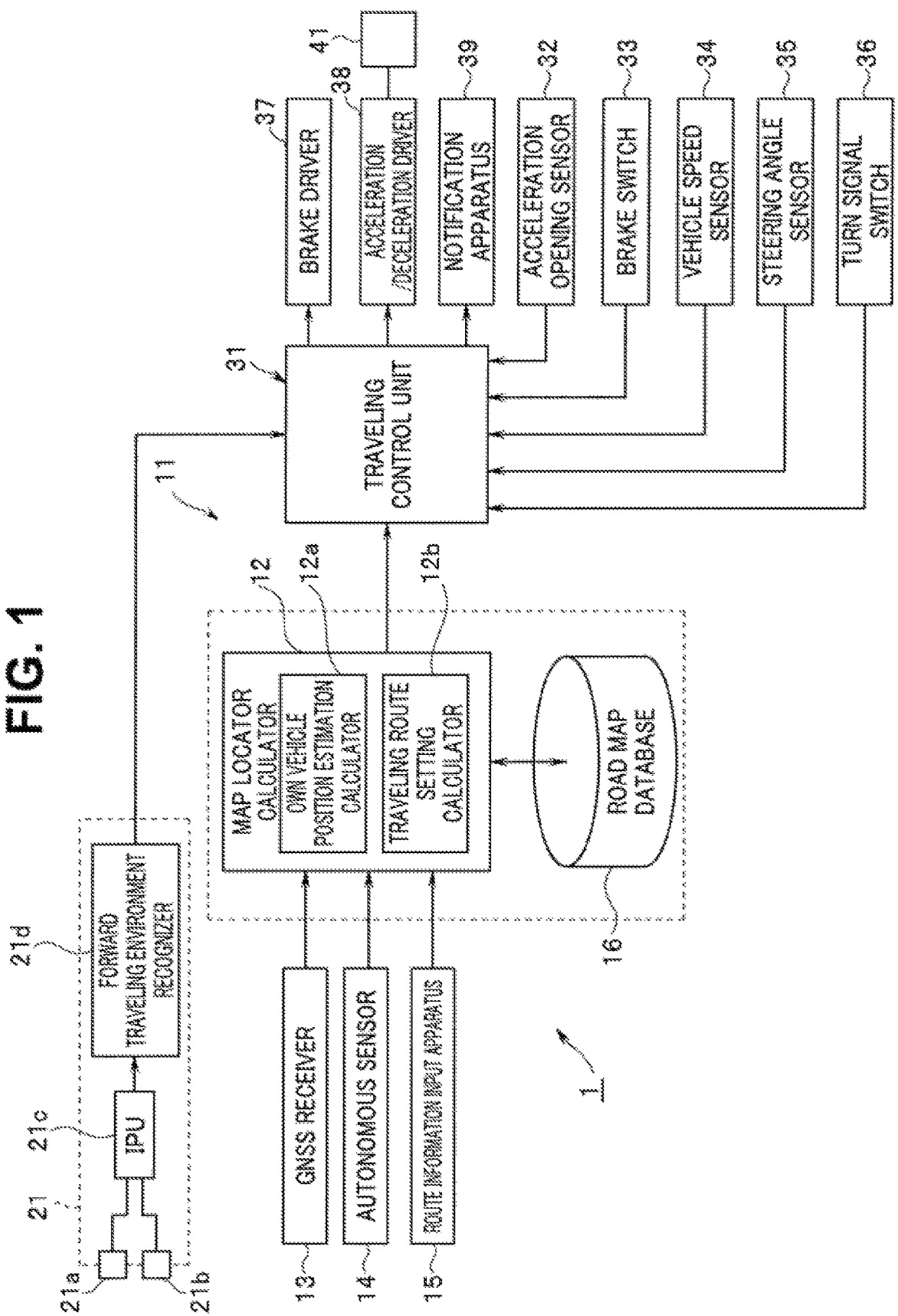
FIG. 1 is an overall schematic diagram of a driving assist apparatus.

Reference numeral 1 in FIG. 1 denotes a driving assist apparatus, which is mounted on each own vehicle M (see FIG. 9 to FIG. 14). The driving assist apparatus 1 is provided with a navigation unit 11, a camera unit 21 and a traveling control unit 31.

The navigation unit 11 includes a map locator calculator 12 and a road map database 16 as a map information storage. The map locator calculator 12, a forward traveling environment recognizer 21d, which will be described later, and the traveling control unit 31 are constituted of a well-known microcomputer provided with a CPU, a RAM, a ROM, a non-volatile storage or the like and peripheral devices, and the ROM stores fixed data such as programs to be executed by the CPU, tables and maps in advance.

A GNSS (global navigation satellite system) receiver 13, an autonomous sensor 14, and a route information input apparatus 15 are coupled to an input side of the map locator calculator 12. The GNSS receiver 13 receives positioning signals emitted from a plurality of positioning satellites. The autonomous sensor 14 estimates the position of the own vehicle in an environment such as an inside of a tunnel where reception sensitivity from the GNSS satellites is low and positioning signals cannot be received effectively. The autonomous sensor 14 includes a vehicle speed sensor, a yaw rate sensor and a longitudinal acceleration sensor or the like. The map locator calculator 12 performs localization from a distance traveled and an azimuth based on the vehicle speed detected by the vehicle speed sensor, the yaw rate (yaw angular velocity) detected by the yaw rate sensor and the longitudinal acceleration detected by the longitudinal acceleration sensor or the like.

The route information input apparatus 15 is a terminal apparatus operated by a driver or a passenger. The route information input apparatus 15 can intensively receive an input of a series of information necessary for the map locator calculator 12 to set a traveling route, such as settings of a destination, transit points (service areas of a highway or the like).

Examples of the route information input apparatus 15 include a touch panel of a monitor provided for the navigation unit 11, a portable terminal represented by a smartphone, a personal computer. The route information input apparatus 15 is coupled to the map locator calculator 12 by a wired or wireless channel.

When the driver or passenger inputs information on a destination or transit points (facility names, addresses, telephone numbers or the like) by operating the route information input apparatus 15, the input information is read by the map locator calculator 12.

When the destination or transit points are inputted, the map locator calculator 12 sets the position coordinates (latitudes, longitudes) of the destination or the transit points. The map locator calculator 12 includes an own vehicle position estimation calculator 12a as an own vehicle position estimator that estimates the position of the own vehicle, which is a current position of the own vehicle M and identifies a traveling lane in which the own vehicle M is traveling and a traveling route setting calculator 12b that sets a traveling route from the position of the own vehicle to the destination (and transit points).

The road map database 16 is a large volume storage medium such as an HDD and stores well-known road map information. The road map information stores information representing a road condition such as a type of the road (general roads, highways or the like), road shape, road azimuth, lane width, intersection (crossroad, T-junction).

The own vehicle position estimation calculator 12a acquires current position coordinates (latitude, longitude) of the own vehicle M based on positioning signals received by the GNSS receiver 13, map-matches the position coordinates on the map information, estimates the position of the own vehicle (current position) on the road map, identifies a traveling lane and obtains an azimuth (own vehicle azimuth) in the traveling direction from a movement history of the own vehicle position.

Furthermore, in an environment such as inside a tunnel where sensitivity of the GNSS receiver 13 deteriorates and effective positioning signals cannot be received from positioning satellites, the own vehicle position estimation calculator 12a performs localization based on the information from the autonomous sensor 14, as described above.

The traveling route setting calculator 12b refers to the road map information stored in the road map database 16 based on the position information (latitude, longitude) of the position of the own vehicle estimated by the own vehicle position estimation calculator 12a and the position information (latitude, longitude) of the input destination (and transit points). The traveling route setting calculator 12b then constructs a traveling route connecting the position of the own vehicle and the destination (destination via transit points if the transit points are set) according to preset route conditions (recommended route, fastest route or the like) on the road map information.

On the other hand, the camera unit 21 is fixed at a top center at the front inside the own vehicle M and includes a vehicle-mounted camera (stereo camera) composed of a main camera 21a and a sub camera 21b disposed at symmetric positions across the center (vehicle width center) in the vehicle width direction, an image processing unit (IPU) 21c and the forward traveling environment recognizer 21d. In the camera unit 21, the main camera 21a picks up images of reference image data and the sub camera 21b picks up images of comparison image data.

Both image data are subjected to predetermined image processing by the IPU 21c. The forward traveling environment recognizer 21d reads the reference image data and the comparison image data image-processed by the IPU 21c, recognizes identical objects in both images based on a parallax between the images, calculates distance data (distance from the own vehicle M to the target) using principles of triangulation and recognizes forward traveling environment information.

The forward traveling environment information includes a road shape of a lane (traveling lane) in which the own vehicle M is traveling (lane markers that define left and right of the lane, road curvature [1/m] at the center between the left and right lane markers and width (lane width) between the left and right lane markers), intersection, traffic light, road labeling, and obstacle ahead (crossing pedestrian, bicycle, utility pole, telegraph pole, parked vehicle or the like) and the forward traveling environment recognizer 21d recognizes them using a well-known technique such as pattern matching. Therefore, the camera unit 21 serves as an obstacle recognition sensor.

The forward traveling environment information is read by the traveling control unit 31. The forward traveling environment recognizer 21d of the camera unit 21 and the map locator calculator 12 are coupled to an input side of the traveling control unit 31. The input side of the traveling control unit 31 is further coupled to an accelerator opening sensor 32 as an accelerator operation amount detector that detects an operation amount of the accelerator pedal (accelerator operation amount) Pacc [deg], a brake switch 33 that is turned ON when the brake pedal is stepped on, a vehicle speed sensor 34 included in the aforementioned autonomous sensor 14, a steering angle sensor 35 that detects a steering angle of a steering operated by the driver and a turn signal switch 36 that is turned ON by the driver when turning right or turning left to cause a right-turning side turn signal or a left-turning side turn signal to blink.

On the other hand, a brake driver 37 for slowing down the own vehicle M by forced brake to avoid collision with an object, an acceleration/deceleration driver 38 that restricts output of a drive source 41 such as an engine or a motor according to an accelerator operation amount by the driver as required and a notification apparatus 39 such as a monitor or a speaker that notifies the driver of information for calling attention to the driver are coupled to an output side of the traveling control unit 31. Note that, the traveling control unit 31 may cause the brake driver 37 to operate to brake the four wheels individually.

When an obstacle having the potential to collide with the own vehicle M is detected in the azimuth of the own vehicle M in which the own vehicle is to travel by steering operation of the driver, the traveling control unit 31 calls attention to the driver by the notification apparatus 39 and further assists the driver's steering operation through integrated vehicle control by the brake driver 37 for braking the four wheels individually and the acceleration/deceleration driver 38, as a collision avoidance operation.

The traveling control unit 31 further reads, at an intersection, a road condition in a direction in which the own vehicle M travels through the driver's steering operation from the road map information stored in the road map database 16 and performs acceleration suppression control as required to suppress abrupt acceleration by mistaking the accelerator pedal for the brake pedal.

Figure 2:
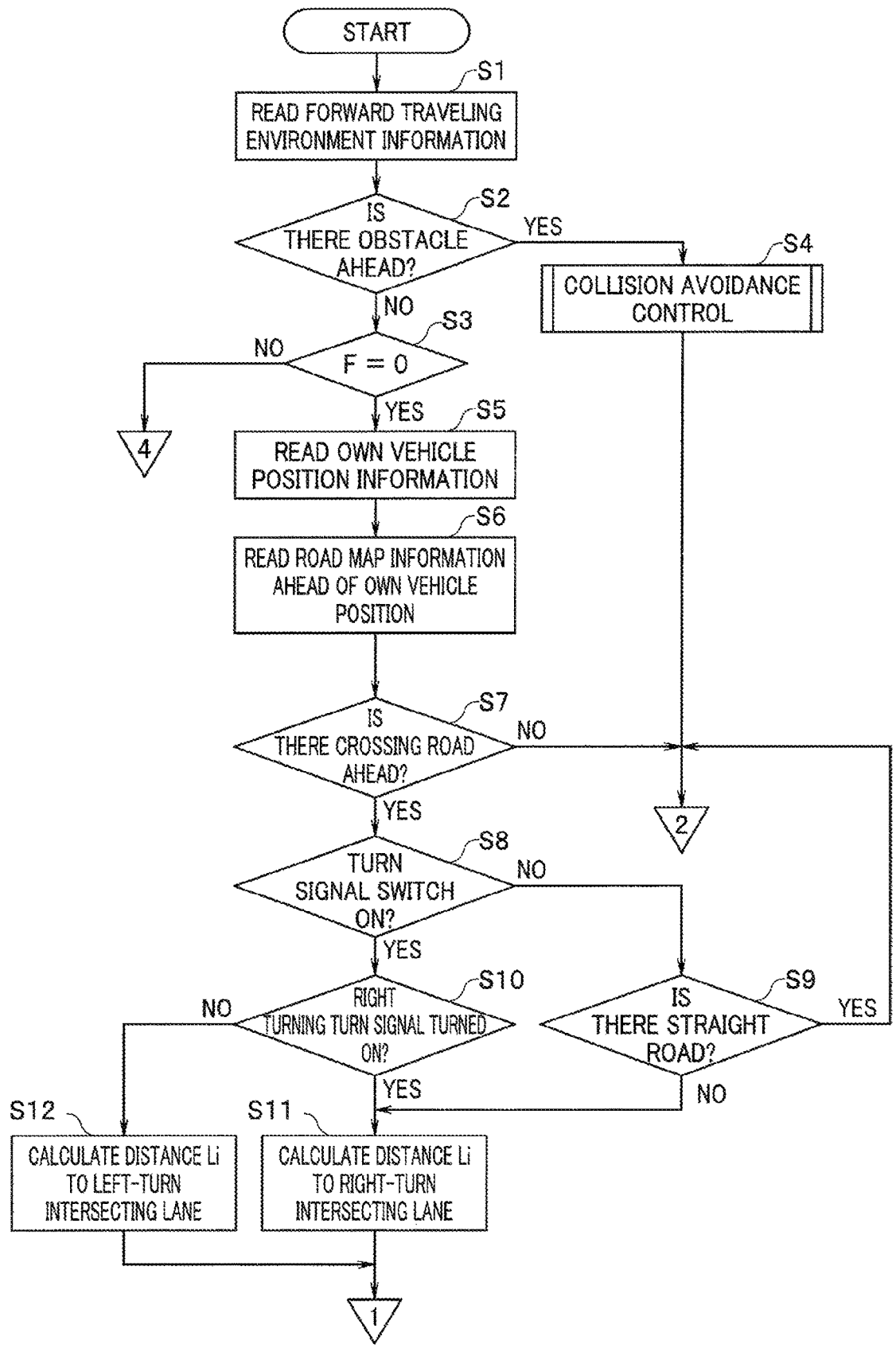
FIG. 2 is a flowchart (No. 1) illustrating an acceleration suppression control routine.
Figure 3:
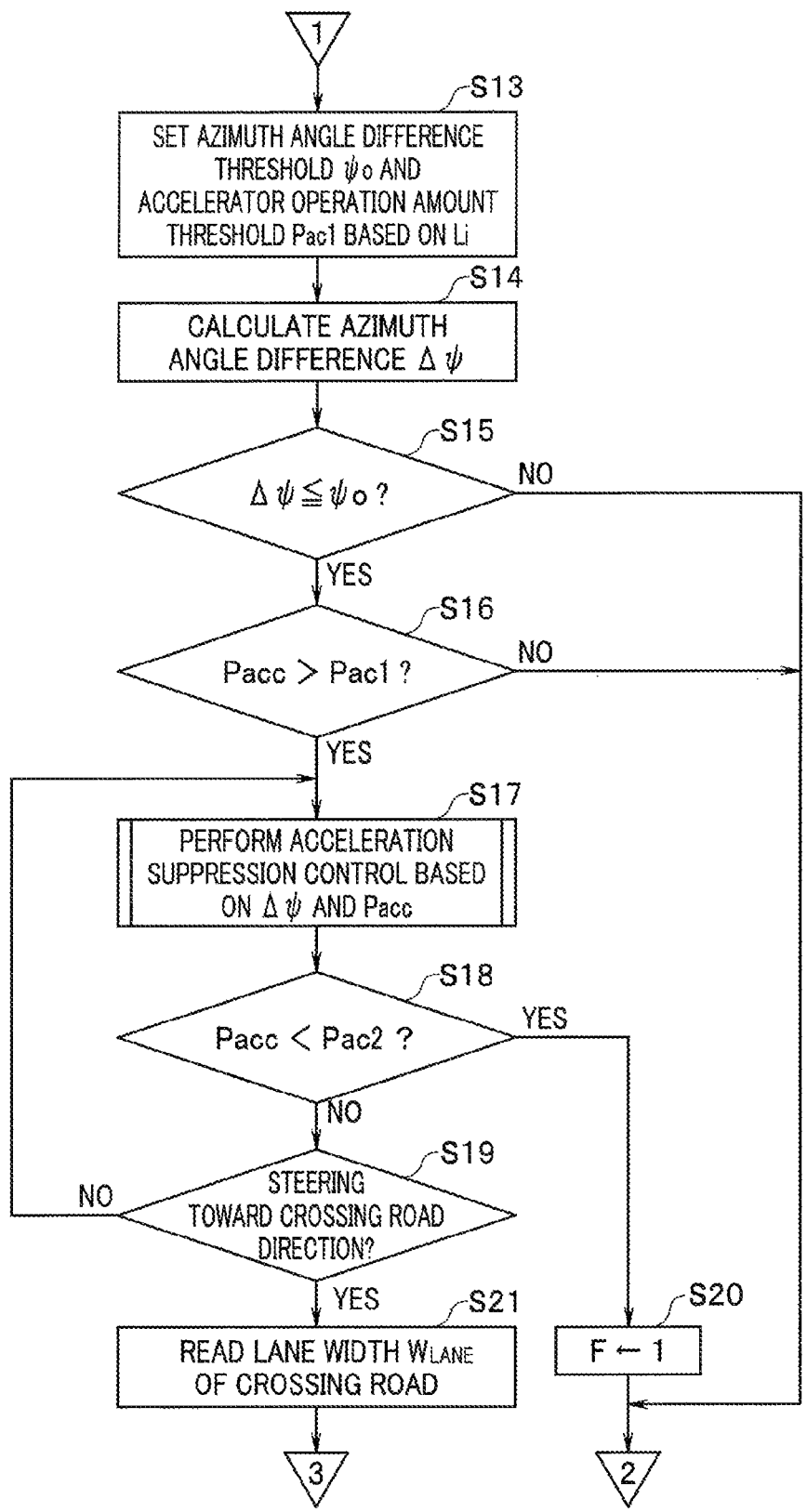
FIG. 3 is a flowchart (No. 2) illustrating the acceleration suppression control routine.
Figure 4:
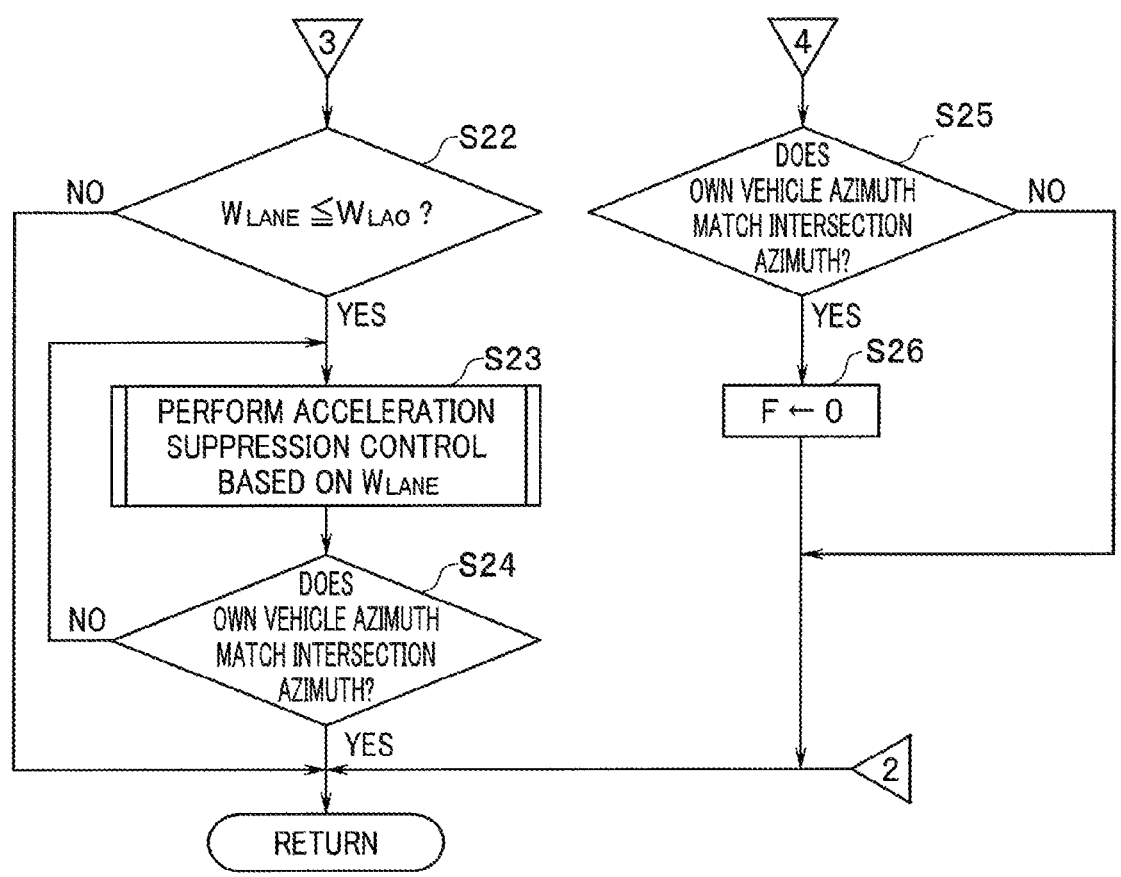
FIG. 4 is a flowchart (No. 3) illustrating the acceleration suppression control routine.

For example, the acceleration suppression control performed by the traveling control unit 31 is processed according to the acceleration suppression control routine illustrated in FIG. 2 to FIG. 4. Note that description will be made below by taking roads where left-hand traffic is stipulated as an example. Therefore, on roads where right-hand traffic is stipulated, the left is read as the right.

In this routine, the forward traveling environment information recognized by the forward traveling environment recognizer 21d of the camera unit 21 is read in step S1 first, the flow proceeds to step S2 to examine whether there is an obstacle with a potential collision risk ahead. When no obstacle with the potential collision risk is recognized, the flow proceeds to step S3, and when an obstacle with the potential collision risk is recognized, the flow branches to step S4. After branching to step S4, collision avoidance control is performed through well-known integrated vehicle control by the brake driver 37 and the acceleration/deceleration driver 38 to avoid collision with the obstacle and the routine exits.

On the other hand, in step S3, the value of an acceleration suppression control cancellation flag F is referred to. The acceleration suppression control cancellation flag F is set in step S20, which will be described later, and cleared in step S26. When F=1, the flow branches to step S25. On the other hand, when F=0, the flow proceeds to step S5 to perform acceleration suppression control.

In step S5, the own vehicle position information estimated by the own vehicle position estimation calculator 12a of the map locator calculator 12 is read, the road map information of the road map database 16 is referred to in step S6 and the road map information ahead of the position of the own vehicle is read based on the own vehicle position information.

Figure 10:
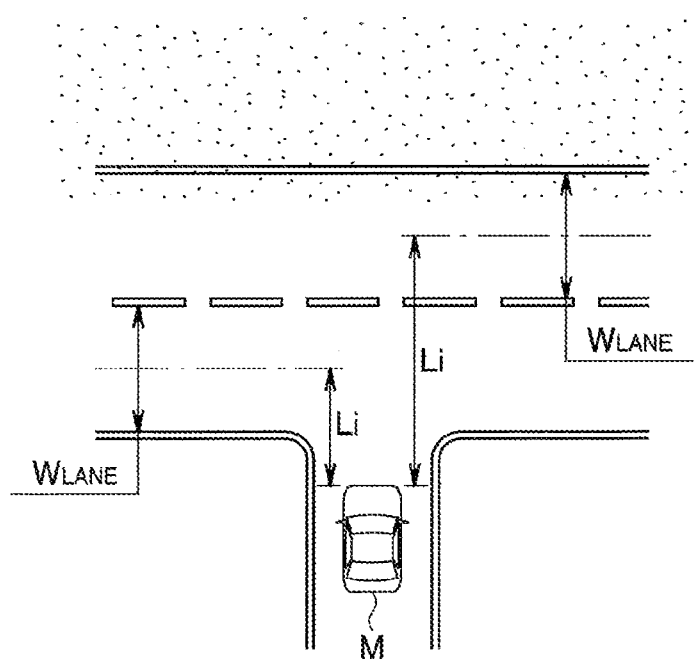
FIG. 10 is an explanatory diagram illustrating acceleration suppression control when the vehicle turns right or left at a T-junction.

The flow proceeds to step S7 and it is examined whether there is a crossing road, based on the road map information ahead of the position of the own vehicle. Here, "ahead of the position of the own vehicle" is a distance at which the driver turns ON the turn signal switch 36 to turn right or turn left, for example, a distance of 30 to 20 meters, but the distance is not limited to this. Furthermore, the "crossing road" is another road connected to the road on which the own vehicle M is traveling, and the crossroad illustrated in FIG. 9 and the T-junction illustrated in FIG. 10 are representatives, and moreover roads connected to a parking lot is also included in the crossing road. In one embodiment, the process in step S7 may correspond to a "crossing road detector".

When it is determined that there is a crossing road, the flow proceeds to step S8 and when no crossing road is detected, the routine exits as is. When the flow proceeds to step S8, whether the turn signal switch 36 is ON is examined, and if the turn signal switch is OFF, the flow branches to step S9. When the turn signal is ON, the flow proceeds to step S10.

When the flow branches to step S9, whether the traveling lane of the own vehicle M runs straight ahead across the crossing road is examined based on the road map information. When the straight road does not continue, for example, in the case of the T-junction as illustrated in FIG. 10, the flow jumps to step S11. In such a case, it is assumed that the driver is trying to turn right or turn left without turning ON the turn signal switch 36.

On the other hand, when the straight road continues as the crossroad illustrated in FIG. 9, since it is assumed that the driver is trying to travel straight ahead, there is no need to perform acceleration suppression control, and so the routine exits.

In this case, as illustrated in FIG. 9 and FIG. 10, when it is not possible to sufficiently secure the field of view ahead of the own vehicle M due to a dense fog, rainfall, snowfall or the like, it is not possible to clearly determine whether the straight road continues based only on the forward traveling environment information acquired by the camera unit 21.

Even when the field of view is secured, for example, in the case of the T-junction illustrated in FIG. 10 where an obstacle such as a guard rail is not disposed ahead of the crossing road, it is not possible to acquire information as to whether the straight road continues, whether there is a step such as a pier or cliff simply from the forward traveling environment information acquired by the camera unit 21.

As a result, it is no longer possible to sufficiently suppress abrupt acceleration by mistaking the accelerator pedal for the brake pedal in a place where abrupt acceleration should originally be sufficiently suppressed. Thus, in the present embodiment, whether the traveling lane of the own vehicle M continues across the crossing road as the straight road is examined based on the road map information.

When the flow proceeds to step S10 upon determining that the turn signal switch 36 has been turned ON, it is examined that the turn signal of which direction has been turned ON, to predict whether the own vehicle M is going to turn right or turn left. When the right turning turn signal is turned ON, the flow proceeds to step S11, and when the left turning turn signal is turned ON, the flow branches to step S12. In one embodiment, the process in this step may correspond to a "right-turning and left-turning prediction unit".

When the flow proceeds to step S11 from step S9 or step S10, a reaching distance Li from the position of the own vehicle M to the right-turn lane (hereinafter referred to as "right-turn intersecting lane") of the crossing road is calculated based on the road map information. When the flow branches to step S12, the reaching distance Li from the position of the own vehicle M to the left-turn lane (hereinafter referred to as "left-turn intersecting lane") of the crossing road is calculated based on the road map information. In this case, as illustrated in FIG. 10, in the present embodiment, the position of the intersecting lane is set to the center (WLANE/2) of a lane width WLANE. Therefore, the reaching distance Li to the right-turn intersecting lane is longer than the reaching distance Li to the left-turn intersecting lane in the case where left-hand traffic is stipulated.

Figure 11:
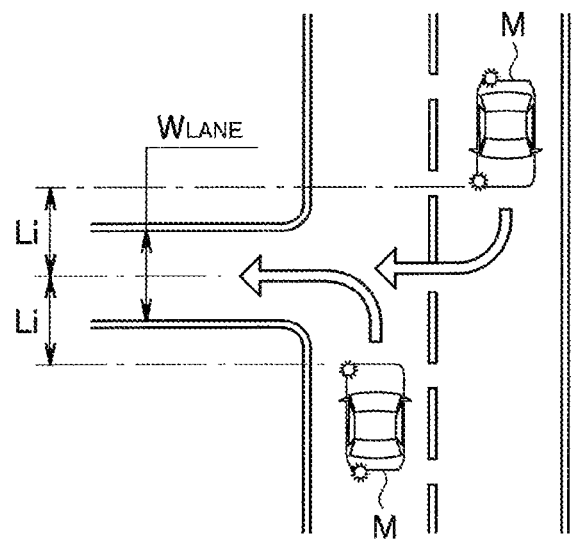
FIG. 11 is an explanatory diagram illustrating acceleration suppression control when the vehicle turns right or left in a direction of a narrower crossing road at a T-junction.
Figure 12:
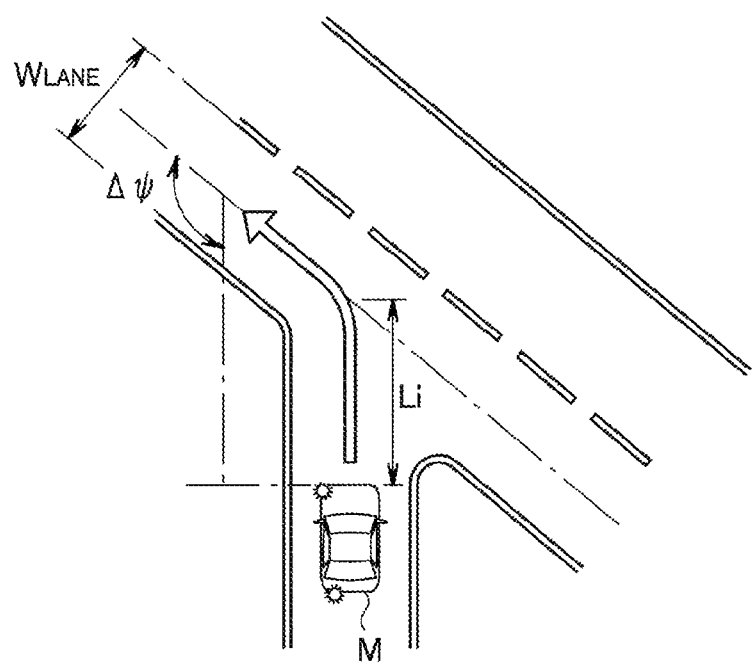
FIG. 12 is an explanatory diagram illustrating acceleration suppression control when the vehicle travels in a direction of a crossing road that crosses a T-junction at an obtuse angle.
Figure 13:
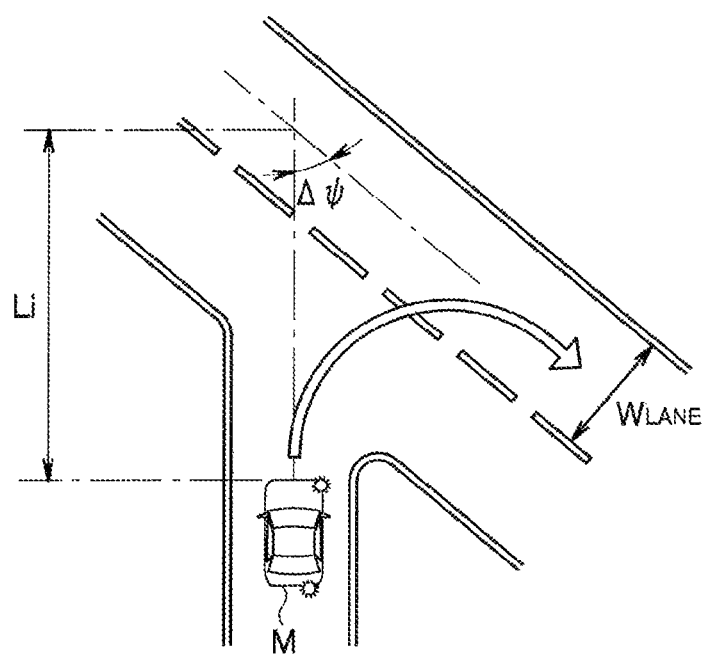
FIG. 13 is an explanatory diagram illustrating acceleration suppression control when the vehicle travels in a direction of a crossing road that crosses a T-junction at an acute angle.
Figure 14:
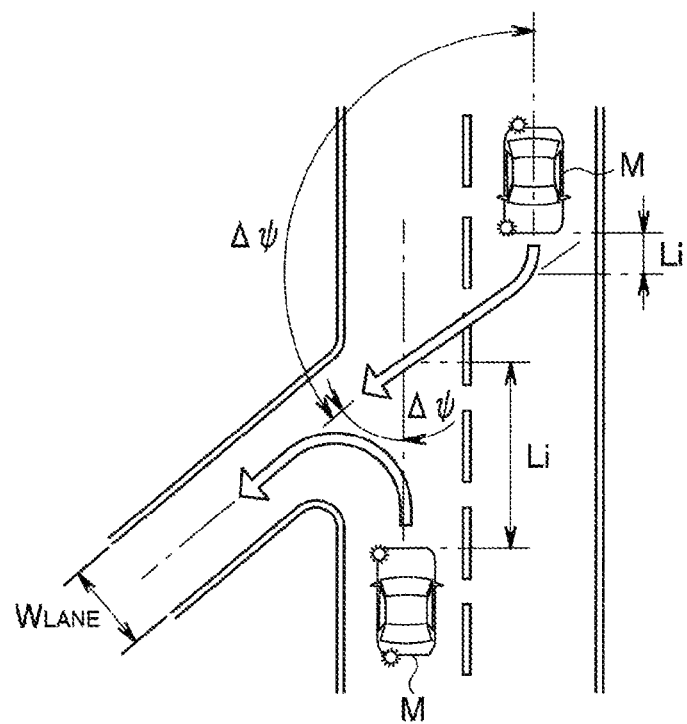
FIG. 14 is an explanatory diagram illustrating acceleration suppression control when the vehicle turns from a priority road to a narrower side road at a T-junction.

The same applies to the case where the driver tries to cause the own vehicle M to turn right or turn left at an intersection of a crossroad as illustrated in FIG. 9 and FIG. 11. Furthermore, when a crossing road diagonally crosses as illustrated in FIG. 12 to FIG. 14, the reaching distance Li is a distance to the position at which the traveling direction of the own vehicle M crosses the intersecting lane. In one embodiment, the processes in steps S11 and S12 may correspond to a "reaching distance calculator".

Even when the turn signal switch 36 is OFF in the aforementioned step S8, if it is determined in step S9 that the straight road does not continue ahead of the crossing road, it is possible to estimate that the driver will cause the own vehicle M to turn right or turn left. In this case, since the reaching distance Li to the intersecting lane is longer for right turning than for left turning, the reaching distance Li to the right-turn intersecting lane is calculated first. As will be described later, the acceleration suppression control becomes stronger as the reaching distance Li becomes shorter. Therefore, if the acceleration suppression control is performed based on the reaching distance Li to the left-turn intersecting lane, when the driver tries to turn right, more than necessary acceleration suppression is performed, which causes discomfort to the driver.

Next, the flow proceeds to step S13 and an azimuth angle difference threshold ψo [deg] and an accelerator operation amount threshold Pac1 [deg] are set based on the reaching distance Li and by table retrieval. Here, the azimuth angle difference Δψ [deg] is an intersection angle between an azimuth in the traveling direction of the own vehicle M and an azimuth of the crossing road to which the vehicle is trying to turn, and Δψ=90 [deg] in the cases of the crossroad illustrated in FIG. 9 and the T-junction illustrated in FIG. 10.

Figure 5:
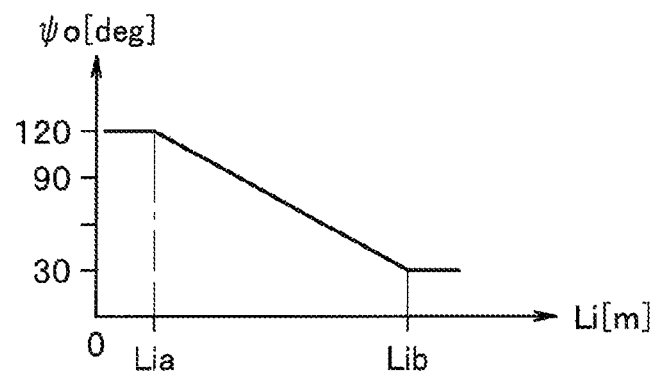
FIG. 5 is a conceptual diagram of an azimuth angle difference threshold setting table.

FIG. 5 illustrates a concept of an azimuth angle difference threshold setting table. As illustrated in FIG. 5, the azimuth angle difference threshold ψo is set to a higher value as the reaching distance Li becomes shorter. Incidentally, a near-side distance (limiting distance) Lia where the azimuth difference threshold ψo becomes constant is approximately 5 meters and a far-side limiting distance Lib is approximately 30 meters. Generally, as the azimuth angle difference Δψ decreases, it is necessary to cause the own vehicle M to slow down earlier and turn more slowly at the intersection. Therefore, the azimuth angle difference threshold ψo is set to a smaller value for a longer reaching distance Li, and when the azimuth angle difference Δψ is larger than the threshold ψo, the acceleration is suppressed. Thus, when the azimuth angle difference Δψ is small, timing of suppressing acceleration is earlier than when the azimuth angle difference Δψ is large.

Figure 6:
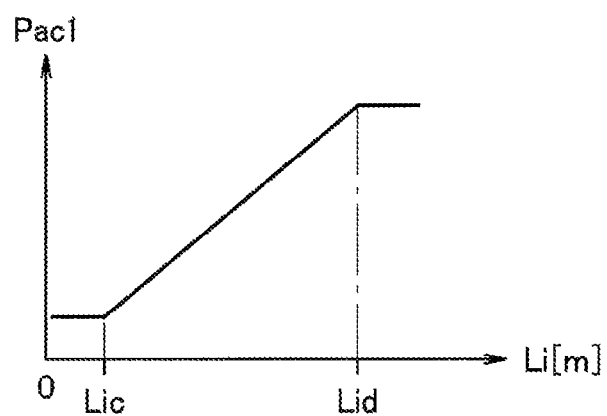
FIG. 6 is a conceptual diagram of an accelerator operation amount threshold setting table.

FIG. 6 illustrates a concept of an accelerator operation amount threshold setting table. As illustrated in FIG. 6, the accelerator operation amount threshold Pac1 is set to a smaller value for a shorter reaching distance Li. Incidentally, a near-side limiting distance Lic is approximately 10 meters and a far-side limiting distance Lid is approximately 50 meters. Generally, the driver sets an intersection as a target point, sets a vehicle speed by visual observation when causing the own vehicle M to turn at the intersection and causes the vehicle to slow down from a distance to reach the vehicle speed. In that case, the accelerator pedal is released from a distance to cause the vehicle to slow down first and the brake pedal is then stepped on to forcibly cause the vehicle to slow down. Thus, a misstep between the brake pedal and the accelerator pedal occurs when the driver steps on the accelerator pedal by mistaking the accelerator pedal for the brake pedal.

When the own vehicle M is abruptly accelerated by stepping on the accelerator pedal by mistaking the accelerator pedal for the brake pedal, the driver further steps on the accelerator pedal in an attempt to stop the own vehicle M. Therefore, the accelerator operation amount threshold setting table sets the accelerator operation amount threshold Pac1 to a smaller value as the reaching distance Li becomes shorter and suppresses acceleration in an early stage.

After that, the flow proceeds to step S14 to calculate an azimuth angle difference Δψ between the azimuth of the own vehicle obtained from the movement history of the own vehicle M and the azimuth of the crossing road to which the vehicle is trying to turn. As illustrated in FIG. 12 and FIG. 13, when the traveling road (traveling lane) of the own vehicle M is diagonally connected to the crossing road, the azimuth angle difference Δψ takes different values depending on the direction in which the own vehicle M is trying to turn. Therefore, when calculating the azimuth angle difference Δψ, whether the own vehicle M is going to turn right or turn left is predicted with reference to the determination result in step S10. In one embodiment, the process in step S14 may correspond to an "azimuth angle difference calculator".

Next, the flow proceeds to step S15 to compare the azimuth angle difference Δψ with the azimuth angle difference threshold ψo. When the azimuth angle difference Δψ is equal to or smaller than the azimuth angle difference threshold ψo (Δψ≤ψo), the flow proceeds to step S16. When the azimuth angle difference Δψ exceeds the azimuth angle difference threshold ψo (Δψ>ψo), it is determined that acceleration need not be suppressed and the routine exits.

When the flow proceeds to step S16, the accelerator operation amount Pacc detected by the accelerator opening sensor 32 is compared with the accelerator operation amount threshold Pac1. When the accelerator operation amount Pacc exceeds the accelerator operation amount threshold Pac1 (Pacc>Pac1), the flow proceeds to step S17. On the other hand, when the accelerator operation amount Pacc is equal to or smaller than the accelerator operation amount threshold Pad (Pacc≤Pac1), it is determined that acceleration need not be suppressed and the routine exits. Thus, in the case where Δψ>ψo or Pacc≤Pac1, no acceleration suppression control is performed, which will never cause uncomfortable feeling to the driver due to insufficient acceleration.

When the flow proceeds to step S17, the acceleration suppression control is performed based on the azimuth angle difference Δψ and the accelerator operation amount Pacc, and the flow proceeds to step S18.

Figure 7A:
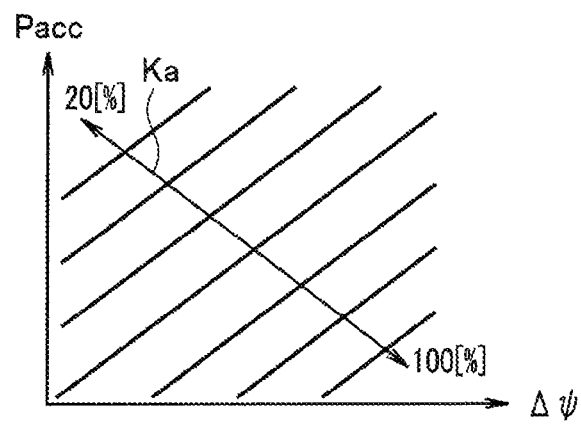
FIG. 7A is a conceptual diagram of an accelerator suppression gain setting map according to an azimuth angle difference and an accelerator operation amount.

The acceleration suppression control sets an acceleration gain Ka [%] as a degree of acceleration suppression based on the azimuth angle difference Δψ and the accelerator operation amount Pacc with reference to an acceleration gain map. The concept of the acceleration gain map is illustrated in FIG. 7A. As illustrated in FIG. 7A, the acceleration gain Ka is set to such a value as to gradually increase the degree of suppressing acceleration (lower the acceleration gain Ka) as the accelerator operation amount Pacc is shifted from a small value to a large value and as the azimuth angle difference Δψ is shifted from a large value to a small value, and a minimum degree is Ka=100 [%].

As illustrated, for example, in FIG. 14, when the roads cross each other at angles other than 90 [deg], if the case where the own vehicle M traveling downward from above in the drawing is about to turn right is compared with the case where the own vehicle M traveling upward from below in the drawing is about to turn left, the own vehicle M, which is about to turn left, needs to slow down more when entering an intersection. Therefore, to suppress abrupt acceleration due to a misstep, it is necessary to set the acceleration gain Ka to suppress acceleration to a smaller value as the azimuth angle difference Δψ decreases.

On the other hand, regarding the accelerator operation amount Pacc, when the driver who is operating the own vehicle M recognizes an intersection at which the vehicle is to be turned right or turned left ahead, the driver releases the accelerator pedal and performs brake operation at a predetermined timing to adjust the speed at the time of reaching the intersection. In order to suppress abrupt acceleration caused by a misstep, it is necessary to set the acceleration gain Ka to a small value since acceleration increases as the accelerator operation amount Pacc increases. The characteristic of the acceleration gain map illustrated in FIG. 7A is set in advance based on a simulation or the like and can be changed as appropriate. The acceleration gain Ka set based on the acceleration gain map restricts the target acceleration corresponding to the drive source 41 to be set by the traveling control unit 31 and suppresses the actual acceleration.

Figure 7B:
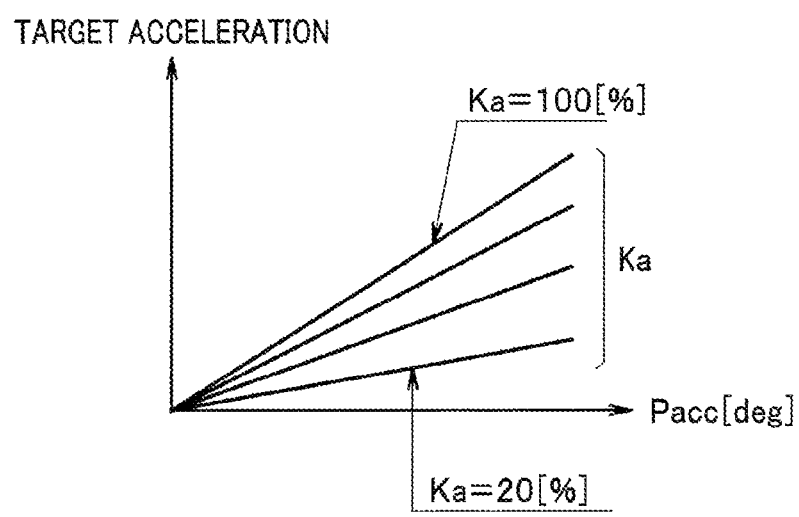
FIG. 7B is a characteristic diagram illustrating a relationship between an accelerator operation amount and target acceleration restricted by an acceleration gain.

That is, the target acceleration is set based on the accelerator operation amount Pacc and the vehicle speed detected by the vehicle speed sensor 34 using an acceleration/deceleration map (not illustrated) as a reference. In the acceleration/deceleration map, larger target acceleration values are set for larger accelerator operation amount Pacc and lower vehicle speeds. Then, suppressed target acceleration is set by multiplying the set target acceleration by the acceleration gain Ka. Therefore, as illustrated in FIG. 7B, the target acceleration is set to a suppressed value according to the acceleration gain Ka with respect to the accelerator operation amount Pacc when the driver steps on the accelerator pedal from a stopped state (vehicle speed=0 [Km/h]).

As a result, when the own vehicle M approaches an intersection or enters the main lane from a parking lot, even when the driver steps on the accelerator pedal by mistaking the accelerator pedal for the brake pedal, the target acceleration is suppressed, and it is thereby possible to prevent abrupt acceleration. In one embodiment, the aforementioned processes in steps S13 to S17 may correspond to an "acceleration suppression degree calculator".

The traveling control unit 31 calculates drive torque corresponding to the suppressed target acceleration, outputs a drive signal corresponding to the drive torque from the acceleration/deceleration driver 38 to the drive source (engine, motor or the like) 41 and causes the own vehicle M to travel. In one embodiment, the traveling control unit 31 may serve as a "traveling state controller".

Next, when the flow proceeds to step S18, the accelerator operation amount Pacc is compared with the accelerator release determination threshold Pac2. The accelerator release determination threshold Pac2 is a value to determine whether the driver has released the accelerator pedal which has been stepped on, and is set to a value approximate to Pacc=0 [deg].

When Pacc≥Pac2, the flow proceeds to step S19. On the other hand, when Pacc<Pac2, it is determined that the driver has consciously released the accelerator pedal, the flow branches to step S20 to set the acceleration suppression control cancellation flag F (F←1) and the routine exits. The value of the acceleration suppression control cancellation flag F is read in the aforementioned step S4, and when F=1, the flow branches to step S25.

When the flow proceeds to step S19, it is examined whether the own vehicle M is steered to turn right or turn left and travel in the direction of an intersecting lane. Whether the own vehicle M is being steered is examined based on the steering angle of the steering detected by the steering angle sensor 35, the yaw rate detected by the yaw rate sensor, or the relationship between a change in the azimuth of the position of the own vehicle map-matched on the road map information of the road map database 16 and the traveling lane. In one embodiment, the process in this step may correspond to a "steering detector".

When steering of the own vehicle M is not detected, the flow returns to step S17 and the processes in steps S17 to S19 are repeated until the steering in the direction of the intersecting lane is detected. When the steering is detected in step S19, the flow proceeds to step S21.

In step S21, the lane width WLANE of the crossing road in the traveling direction is acquired with reference to the road map information of the road map database 16.

Alternatively, when a lane marker that partitions the crossing road in the traveling direction into left and right sides is recognized based on the forward traveling environment acquired by the forward traveling environment recognizer 21d of the camera unit 21, the lane width WLANE may be obtained from the distance between the lane markers. In one embodiment, the process in this step may correspond to a "lane width acquisition unit".

The flow then proceeds to step S22 to compare the lane width WLANE with a lane width threshold WLAO set in advance. The lane width threshold WLAO is a lower limit value of the lane width where the own vehicle M can pass with ease and is set according to the vehicle width of the own vehicle M. For example, when the lane width threshold WLAO is set to on the order of twice the vehicle width, if the vehicle width of the own vehicle M is 1800 [mm], the lane width threshold WLAO is set to on the order of 3600 [mm].

When WLANE>WLAO, it is determined that acceleration suppression control need not be performed and the routine exits. On the other hand, when WLANE≤WLAO, the flow proceeds to step S23 where acceleration suppression control during the turning steering is performed. Even when WLANE>WLAO, if the forward traveling environment recognizer 21d of the camera unit 21 detects an obstacle having the potential to collide (curb stone, utility pole, telegraph pole, parked vehicle, guard rail, fence, or the like) ahead, during the turning steering, collision avoidance control is performed in the aforementioned step S4. Thus, even when the driver steps on the accelerator pedal by mistaking the accelerator pedal for the brake pedal, it is possible to prevent abrupt acceleration.

Figure 8:
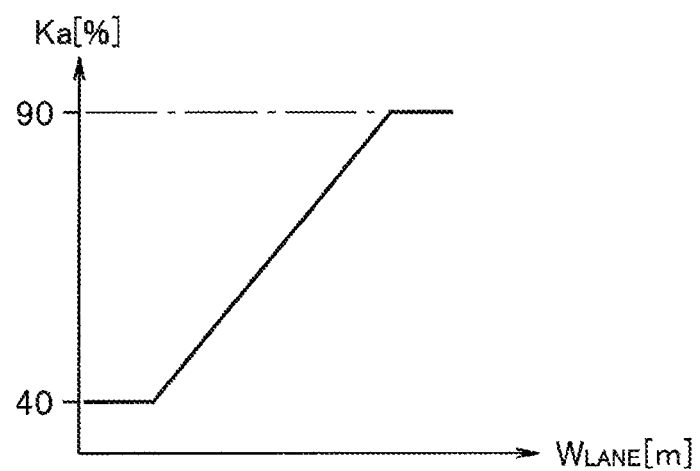
FIG. 8 is a conceptual diagram of the acceleration suppression gain setting table based on a lane width of a crossing road.

In step S23, acceleration suppression control during turning steering is performed. In the acceleration suppression control, an acceleration gain Ka is set with reference to the acceleration suppression gain setting table based on the lane width WLANE in the traveling direction of the crossing road. FIG. 8 illustrates a concept of the acceleration suppression gain setting table. The acceleration gain Ka is proportional to the lane width WLANE and a lower value is set as the lane width WLANE becomes narrower. That is, when the own vehicle M is steered to turn, the narrower the lane width WLANE, the more it is necessary to suppress abrupt acceleration due to a misstep.

The aforementioned target acceleration is multiplied by the acceleration gain Ka to set suppressed target acceleration. As a result, when the driver steers to turn the own vehicle M in the lane direction of the crossing road, even though the driver steps on the accelerator pedal strongly by mistaking it for the brake pedal, since the target acceleration is suppressed according to the lane width WLANE as illustrated in FIG. 7B, it is possible to prevent abrupt acceleration when entering a narrow lane.

After that, the flow proceeds to step S24 to examine whether the azimuth of the own vehicle matches the road azimuth of the crossing road in the traveling direction. Whether the azimuth of the own vehicle matches the road azimuth is examined by determining, for example, whether the azimuth of the own vehicle obtained from the movement history of the position of the own vehicle matches the road azimuth acquired from the road map information. Alternatively, whether the traveling direction of the own vehicle M is parallel to the lane markers that define the left and right of the traveling lane recognized by the camera unit 21.

When the azimuth of the own vehicle has not match the road azimuth yet, the flow returns to step S23 to repeatedly perform acceleration suppression control. When the azimuth of the own vehicle matches the road azimuth, the routine exits and the acceleration suppression control ends.

On the other hand, when the flow branches from step S3 to step S25, whether the azimuth of the own vehicle matches the road azimuth of the crossing road in the traveling direction is examined. Examination whether the azimuth of the own vehicle matches the road azimuth of the crossing road in the traveling direction is the same as the process in the aforementioned step S24, and so description thereof is omitted.

In the acceleration suppression control routine, when the driver releases the accelerator pedal (Pacc<Pac2), the acceleration suppression control cancellation flag F is set in step S20 (F←1). As a result, the flow branches from step S3 to step S25 without performing the acceleration suppression control, and so the acceleration suppression control is substantially canceled. In one embodiment, the processes in steps S18 and S20 may correspond to an "acceleration suppression control cancellation detector".

When it is determined in step S25 that the azimuth of the own vehicle matches the road azimuth of the crossing road in the traveling direction, the flow proceeds to step S26 where the acceleration suppression control cancellation flag F is cleared (F←0), and the routine exits.

Therefore, when the driver releases the accelerator pedal during the acceleration suppression control, the acceleration suppression control is automatically canceled. Therefore, in the case of so-called double stepping, that is, when the driver steps on the accelerator pedal again, it is determined that the driver has consciously stepped on the accelerator pedal and sets normal target acceleration (corresponding to Ka=100 [%] in FIG. 7B) corresponding to the operation amount of the accelerator pedal of the driver.

Thus, according to the present embodiment, a forward environment that cannot be recognized by the camera unit 21 is acquired from the road map information, whether there is a straight road continuous to the traveling lane of the own vehicle ahead of the crossing road is examined and acceleration suppression control is performed when the straight road does not continue, and so it is possible to recognize, in advance, a place where abrupt acceleration needs to be suppressed without using an obstacle recognition sensor and properly suppress the abrupt acceleration due to a misstep in the place.

In addition, the azimuth angle difference threshold $\psi o$ and the accelerator operation amount threshold Pac1 are set in accordance with the reaching distance Li from the own vehicle M to the intersecting lane of the crossing road, and the azimuth angle difference $\Delta\psi$ is compared with the azimuth angle difference threshold $\psi o$ and the accelerator operation amount Pacc is compared with the accelerator operation amount threshold Pac1. If $\Delta\psi > \psi o$ or Pacc≤Pac1, the acceleration suppression control is not performed, which will never cause uncomfortable feeling to the driver due to insufficient acceleration.

Furthermore, in the case of double stepping on the accelerator pedal, the double stepping is determined as an acceleration request by the driver's intention and the acceleration suppression control is not performed, and traveling in line with the driver's intention can be performed.

Note that the technology is not limited to the aforementioned embodiment, but is also applicable to a case where the driving mode of, for example, an automatic driving vehicle is shifted from an automatic driving mode to a manual driving mode in which the driver performs steering operation.

Each of the traveling control unit 31 and the map locator calculator 12 illustrated in FIG. 1 can be implemented by the afore-mentioned microcomputer and also by the circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the map locator calculator 12 including the own vehicle position estimation calculator 12a and the traveling route setting calculator 12b and the automatic driving control unit 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

As described above, the technology identifies a traveling lane on road map information stored in the map information storage based on an estimated position of the own vehicle, detects whether there is a crossing road ahead of the traveling lane, calculates, when the crossing road is detected, an azimuth angle difference between an azimuth of the crossing road where the own vehicle is about to turn and the azimuth in the traveling direction of the own vehicle, sets a higher degree of acceleration suppression as the azimuth angle difference becomes narrower, based on the azimuth angle difference, suppresses target acceleration based on the degree of acceleration suppression, and so it is possible to recognize, in advance, a place where abrupt acceleration needs to be suppressed without using an obstacle recognition sensor and appropriately suppress abrupt acceleration due to a misstep in the place.

The invention claimed is:

1. A vehicle driving assist apparatus comprising:
an acceleration suppression degree calculator configured to calculate a degree of acceleration suppression for suppressing acceleration of an own vehicle;
a traveling state controller configured to suppress target acceleration of the own vehicle on a basis of the calculated degree of acceleration suppression;
a map information storage configured to store road map information;
an own vehicle position estimator configured to estimate a current position of the own vehicle, and identify a traveling lane on the stored road map information on a basis of the estimated current position of the own vehicle;
a crossing road detector configured to detect, on a basis of the stored road map information, that there is a crossing road ahead of the identified traveling lane; and
an azimuth angle difference calculator configured to calculate, when the crossing road is detected, an azimuth angle difference between an azimuth of the crossing road where the own vehicle is about to turn and an azimuth in the traveling direction of the own vehicle,
wherein the acceleration suppression degree calculator sets the degree of acceleration suppression to a higher value as the azimuth angle difference becomes narrower, on a basis of the calculated azimuth angle difference,
wherein the vehicle driving assist apparatus further comprises a reaching distance calculator configured to calculate a reaching distance from the own vehicle to the crossing road,
wherein the acceleration suppression degree calculator sets an azimuth angle difference threshold to a higher value as the reaching distance becomes shorter on a basis of the calculated reaching distance, and
wherein, when the calculated azimuth angle difference is equal to or smaller than the azimuth angle difference threshold, the acceleration suppression degree calculator sets the degree of acceleration suppression on a basis of the azimuth angle difference.

2. The vehicle driving assist apparatus according to claim 1, further comprising
an accelerator operation amount detector configured to detect an operation amount of an accelerator pedal,
wherein the acceleration suppression degree calculator sets the acceleration suppression degree to the higher value as the azimuth angle difference becomes narrower and the operation amount of the accelerator pedal increases, on a basis of the calculated azimuth angle difference and the detected operation amount of the accelerator pedal.

3. The vehicle driving assist apparatus according to claim 2,
wherein the acceleration suppression degree calculator sets an accelerator operation amount threshold to a lower value as the reaching distance becomes shorter on a basis of the calculated reaching distance, and
wherein, when the operation amount of the detected accelerator pedal exceeds the accelerator operation amount threshold, the acceleration suppression degree calculator sets the degree of acceleration suppression on a basis of the operation amount of the accelerator pedal.

4. The vehicle driving assist apparatus according to claim 3, further comprising
a right-turning and left-turning prediction unit configured to predict whether the own vehicle will turn right or turn left on the crossing road,
wherein the azimuth angle difference calculator calculates the azimuth angle difference from an intersection angle between the azimuth of the own vehicle and an azimuth in a right turning direction of the crossing road or a left turning direction of the crossing road predicted by the right-turning and left-turning prediction unit.

5. The vehicle driving assist apparatus according to claim 3, wherein
the own vehicle is an automatic driving vehicle,
when a driving mode of the automatic driving vehicle is shifted from an automatic driving mode to a manual driving mode in which a driver performs steering operation, the acceleration suppression degree calculator calculates the degree of acceleration suppression, and
the traveling state controller suppresses acceleration of the own vehicle on the basis of the calculated degree of acceleration suppression.

6. The vehicle driving assist apparatus according to claim 2, further comprising
a right-turning and left-turning prediction unit configured to predict whether the own vehicle will turn right or turn left on the crossing road,
wherein the azimuth angle difference calculator calculates the azimuth angle difference from an intersection angle between the azimuth of the own vehicle and an azimuth in a right turning direction of the crossing road or a left turning direction of the crossing road predicted by the right-turning and left-turning prediction unit.

7. The vehicle driving assist apparatus according to claim 2, wherein
the own vehicle is an automatic driving vehicle,
when a driving mode of the automatic driving vehicle is shifted from an automatic driving mode to a manual driving mode in which a driver performs steering operation, the acceleration suppression degree calculator calculates the degree of acceleration suppression, and
the traveling state controller suppresses acceleration of the own vehicle on the basis of the calculated degree of acceleration suppression.

8. The vehicle driving assist apparatus according to claim 1, further comprising:
a steering detector configured to detect steering of the own vehicle in a direction of the crossing road; and
a lane width acquisition unit configured to acquire a lane width of the crossing road,
wherein, when the steering detector detects steering in the direction of the crossing road, the acceleration suppression degree calculator sets the degree of acceleration suppression to a higher value as the lane width becomes narrower on a basis of the acquired lane width of the crossing road.

9. The vehicle driving assist apparatus according to claim 1, further comprising
a right-turning and left-turning prediction unit configured to predict whether the own vehicle will turn right or turn left on the crossing road,
wherein the azimuth angle difference calculator calculates the azimuth angle difference from an intersection angle between the azimuth of the own vehicle and an azimuth in a right turning direction of the crossing road or a left turning direction of the crossing road predicted by the right-turning and left-turning prediction unit.

10. The vehicle driving assist apparatus according to claim 1, wherein
the own vehicle is an automatic driving vehicle,
when a driving mode of the automatic driving vehicle is shifted from an automatic driving mode to a manual driving mode in which a driver performs steering operation, the acceleration suppression degree calculator calculates the degree of acceleration suppression, and
the traveling state controller suppresses acceleration of the own vehicle on the basis of the calculated degree of acceleration suppression.

11. The vehicle driving assist apparatus according to claim 1, further comprising:
an accelerator operation amount detector configured to detect an operation amount of an accelerator pedal; and
an acceleration suppression control cancelation detector configured to detect release of the accelerator pedal, on a basis of the detected operation amount of the accelerator pedal,
wherein, when the acceleration suppression control cancelation detector detects a release of the accelerator pedal, the traveling state controller cancels the suppression on the target acceleration.

12. A vehicle driving assist apparatus comprising:
a map information storage configured to store road map information; and
circuitry configured to
calculate a degree of acceleration suppression for suppressing acceleration of an own vehicle,
suppress target acceleration of the own vehicle on a basis of the calculated degree of acceleration suppression,
estimate a current position of the own vehicle,
identify a traveling lane on the stored road map information on a basis of the estimated current position of the own vehicle,
detect, on a basis of the stored road map information, that there is a crossing road ahead of the identified traveling lane,
calculate, when the crossing road is detected, an azimuth angle difference between an azimuth of the crossing road where the own vehicle is about to turn and an azimuth in the traveling direction of the own vehicle, and set the degree of acceleration suppression to a higher value as the azimuth angle difference becomes narrower, on a basis of the calculated azimuth angle difference, wherein the circuitry is further configured to calculate a reaching distance from the own vehicle to the crossing road, wherein the circuitry sets an azimuth angle difference threshold to a higher value as the reaching distance becomes shorter on a basis of the calculated reaching distance, and wherein, when the calculated azimuth angle difference is equal to or smaller than the azimuth angle difference threshold, the circuitry sets the degree of acceleration suppression on a basis of the azimuth angle difference.

* * * * *